United States Patent
Soos

(10) Patent No.: US 7,579,786 B2
(45) Date of Patent: Aug. 25, 2009

(54) METHOD, APPARATUS, AND SYSTEM FOR DRIVING LED'S

(75) Inventor: Stephen C. Soos, Tully, NY (US)

(73) Assignee: Applied Concepts, Inc., Tully, NY (US)

(*) Notice: Subject to any disclaimer, the term of this patent is extended or adjusted under 35 U.S.C. 154(b) by 206 days.

(21) Appl. No.: 11/809,944

(22) Filed: Jun. 4, 2007

(65) Prior Publication Data

US 2008/0297058 A1 Dec. 4, 2008

(51) Int. Cl.
*G05F 1/00* (2006.01)

(52) U.S. Cl. .................. 315/291; 315/307; 315/360; 315/312; 327/108; 345/46

(58) Field of Classification Search ... 315/169.1–169.3, 315/291, 307, 247, 224, 276, 282, 312, 360; 345/82, 88, 102, 46; 327/108, 109
See application file for complete search history.

(56) References Cited

U.S. PATENT DOCUMENTS 5,793,163 A * 8/1998 Okuda .................. 315/169.2

(Continued)

FOREIGN PATENT DOCUMENTS

EP 1675097 A2 6/2006

(Continued)

OTHER PUBLICATIONS

Soos, Stephen C., 17.3: Versatile LED Backlight Controller Electrical Design, Aug. 31, 2006, 5 pages, Applied Concepts, Inc., Tully, New York.

(Continued)

*Primary Examiner*—Haissa Philogene
(74) *Attorney, Agent, or Firm*—Marjama Muldoon Blasiak & Sullivan LLP

(57) ABSTRACT

A method and apparatus for driving LED's is disclosed, comprising the steps of receiving a desired intensity value, wherein the desired intensity value represents the desired intensity for the LED's; generating a first switching control signal, wherein the first switching control signal is a pulse width modulated signal whose duty cycle is based on the desired intensity value; switching the LED's on and off based on the first switching control signal, wherein the switching takes place when the desired intensity value is less than a first desired intensity value threshold; generating a desired constant current value based on the desired intensity value, wherein the desired constant current value represents the value of the desired constant current to drive the LED's; determining an actual constant current value, wherein the actual constant current value represents the value of the actual constant current driving the LED's; comparing the actual constant current value with the desired constant current value; and adjusting the output of the primary drive of the LED's so that the actual constant current value is equal to the desired constant current value. A system for providing LED backlighting of a display is also disclosed, comprising a first constant current source driver, wherein the constant current source driver comprises a primary drive and a step-up circuit; a first series connection of LED's, wherein the LED's are driven by the first constant current driver; and wherein the first constant current source provides a forward voltage of 42 volts or greater to drive the first series connection of LED's.

18 Claims, 3 Drawing Sheets

U.S. PATENT DOCUMENTS

| | | | |
|---|---|---|---|
| 5,912,568 A | 6/1999 | Kiley | |
| 6,791,283 B2* | 9/2004 | Bowman et al. | 315/291 |
| 6,891,525 B2 | 5/2005 | Ogoro et al. | |
| 6,949,772 B2* | 9/2005 | Shimizu et al. | 257/99 |
| 6,980,181 B2 | 12/2005 | Sudo et al. | |
| 7,057,359 B2 | 6/2006 | Hung et al. | |
| 7,093,967 B2 | 8/2006 | Chang et al. | |
| 7,093,971 B2 | 8/2006 | Yu et al. | |
| 7,095,457 B2 | 8/2006 | Chou et al. | |
| 7,129,652 B2 | 10/2006 | Patel et al. | |
| 7,262,752 B2* | 8/2007 | Weindorf | 345/82 |
| 7,408,308 B2* | 8/2008 | Sawada et al. | 315/291 |
| 2001/0013854 A1 | 8/2001 | Ogoro | |
| 2002/0130786 A1 | 9/2002 | Weindorf | |
| 2002/0159002 A1 | 10/2002 | Chang | |
| 2003/0057275 A1 | 3/2003 | Koenig et al. | |
| 2005/0133800 A1 | 6/2005 | Park et al. | |
| 2006/0066767 A1 | 3/2006 | Kao et al. | |
| 2006/0192501 A1 | 8/2006 | Ogura et al. | |
| 2006/0203479 A1 | 9/2006 | Lai et al. | |
| 2006/0255753 A1 | 11/2006 | Sawada et al. | |
| 2006/0284575 A1 | 12/2006 | Shen et al. | |
| 2007/0159421 A1* | 7/2007 | Peker et al. | 345/82 |

FOREIGN PATENT DOCUMENTS

| | | |
|---|---|---|
| EP | 1729543 A1 | 12/2006 |
| JP | 2004547 | 1/1990 |
| JP | 2002231471 | 8/2002 |
| WO | WO-03107319 A1 | 12/2003 |

OTHER PUBLICATIONS

Applied Concepts Introduces I-Drive—A Series of Complete LED Driver Solutions for High Bright Light Emitting Diodes (HBLEDs), Aug. 31, 2006, 1 page, Applied Concepts, Inc., Tully, New York—www.acipower.com.

* cited by examiner

METHOD, APPARATUS, AND SYSTEM FOR DRIVING LED'S

BACKGROUND OF THE INVENTION

This invention generally relates to light emitter diode (LED) backlighting of liquid crystal displays (LCD), including the driving and control of those LED's.

LCD displays comprise a significant percentage of the market for display sizes large and small, including displays for cash registers, product dispensers, gas pumps, computer displays (laptop and stand alone), and flat panel televisions. The lighting for these LCD displays is typically provided by a backlight unit installed underneath a display panel, wherein the backlight unit includes one or more light sources and a light diffusion means for providing a uniformly distributed light source. Depending on the position of the light source(s), backlight units can be categorized as either edge type or direct type. Edge type backlight units typically consist of one or more edge rails where the light sources are located.

A significant percentage of backlight units for LCD displays use cold cathode fluorescent lamps (CCFL) for their light sources. CCFL light sources can require a starting voltage of approximately 1,200V and a sustaining voltage of approximately 500V. Recently, LED's, including High Bright LED's (HBLEDs), have been used as light sources in backlight units. Generally, LED backlight units provide advantages over CCFL backlight units based on the LED's inherent compactness, solid state nature, and operation at lower voltage levels and temperatures without the need for ignition voltage or a warm-up period. Given these characteristics, it would be advantageous to provide an LED backlight system to be used in lieu of or as a replacement/retrofit for CCFL backlight units or similar backlight units without having to necessarily replace or modify all of the hardware and optics typically used for the LCD display, including, for example, the front frame, lens sheet, diffuser sheet, light pipe, reflector sheet, reflector, and back frame.

Although there are certain advantages, the use of LED backlight units also present challenges with respect to thermal management, diffusion of point source light, driving, and control to provide the required performance. LED's generally provide a predominantly fixed voltage drop over a specified range of drive current levels. Accordingly, to drive LED backlight units, it is often necessary to provide a constant current source to provide the desired brightness. Given these electrical properties, each series connection of LED's in an LED backlight unit requires constant current and a forward voltage drop that increases as the number of LED's in the particular series increases. For example, for a series connection of 24 HBLED's, where each HBLED is driven at 1.0 amps and has a fixed voltage drop of 3 volts, the driving system must be capable of providing 72 volts for that particular series of HBLED's. Since many applications only have access to input voltages in the range of +5V to +24V with +12V being the most common, many LED backlight applications will require a driver unit that can develop the required forward voltage.

In order to minimize the required forward voltage for a series connection of a significant number of LED's required to provide edge lighting (e.g., 24 HBLED's requiring a forward voltage of approximately 72 volts), prior art solutions break the entire series connection of LED's into parallel banks of series LED's (e.g., 4 banks of 6 LED's), with each bank requiring a lower forward voltage (e.g., 18 volts). Typically, any LED backlight solution requiring +42V or greater has resulted in the use of parallel banks of series LED's.

One apparent advantage of the use of multiple banks of LED's is minimizing the impact of a failure of a series of LED's. In order to maintain the proper current balance in this arrangement for each parallel bank, however, it is necessary to provide a series dropping resistor between each of the banks, which leads to inefficient power delivery based on the losses across these resistors. This banked configuration also requires additional wiring for each separate bank. In order to improve power efficiency and thermal management, and minimize wiring requirements, it would be advantageous to provide an LED backlight system using a series connection that avoided the use of resistors but still provided protection against losing an entire series of LED's in the event of a failure as well as the appropriate driver unit for this application.

Another consideration in using LED backlight modules is accomplishing the required intensity or dimming control for a particular application. Intensity or dimming control is necessary for many backlight applications. In many battery-operated applications, dimming provides a benefit by extending battery life since the backlight unit consumes a significant portion of the system's power budget. While some of these applications only require fairly modest dimming ranges on order of 5 to 1 or less, other applications, including those that need to be viewed during the day or night may require a dimming range as wide as 1,000 to 1. As with CCFL's, dimming of LED's can be accomplished by varying the constant current level (amplitude) driving the LED's. However, operating the LED or series connection of LED's at relatively low current (e.g., 1 to 10% of full output brightness) can result in luminous instability, which in turn results in flickering observed by the human eye. Accordingly, while varying the amplitude of the constant current will be effective to accomplish dimming over the majority of the desired range, dimming at the lowest levels will be compromised. In order to improve dimming control and performance, it would be advantageous to provide a driver unit that would allow for satisfactory dimming control across the entire desired dimming range, including at the lowest levels.

SUMMARY OF THE INVENTION

In one embodiment of the present invention, a method and apparatus for driving LED's is disclosed, comprising the steps of receiving a desired intensity value, wherein the desired intensity value represents the desired intensity for the LED's; generating a first switching control signal, wherein the first switching control signal is a pulse width modulated signal whose duty cycle is based on the desired intensity value; switching the LED's on and off based on the first switching control signal, wherein the switching takes place when the desired intensity value is less than a first desired intensity value threshold; generating a desired constant current value based on the desired intensity value, wherein the desired constant current value represents the value of the desired constant current to drive the LED's; determining an actual constant current value, wherein the actual constant current value represents the value of the actual constant current driving the LED's; comparing the actual constant current value with the desired constant current value; and adjusting the output of the primary drive of the LED's so that the actual constant current value is equal to the desired constant current value.

A system for providing LED backlighting of a display is also disclosed, comprising a first constant current source driver, wherein the constant current source driver comprises a primary drive and a step-up circuit; a first series connection of LED's, wherein the LED's are driven by the first constant current driver; and wherein the first constant current source provides a forward voltage of 42 volts or greater to drive the first series connection of LED's.

DETAILED DESCRIPTION OF THE PREFERRED EMBODIMENT

Figure 1:
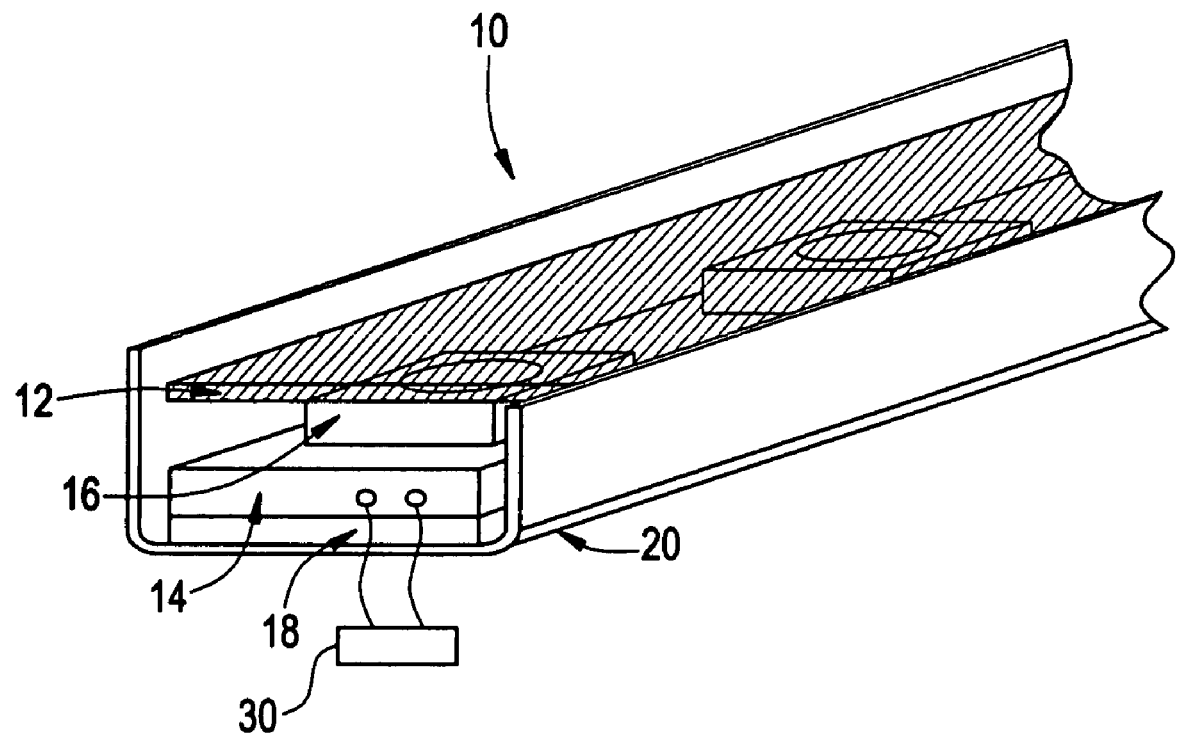
FIG. 1 is a perspective view of an LED backlight unit.

FIG. 1 shows an LED backlight unit 10 that can be used to provide edge lighting for a LCD display. The main components of the LED backlight unit 10 include the window 12, printed circuit board 14, LED's 16, and thermal conductive material 18. The LED backlight unit 10 is configured so as to fit within the edge rail housing 20 of the backlight light source. Alternatively, the LED backlight unit 10 can also include the edge rail housing 20. The window 12 may be of a clear or opaque material or may be a specialized optical element providing the required light focusing and diffusion. The printed circuit board 14 provides the mounting surface for the LED's 16 and can be configured to allow the thermal material 18 to contact the underside of the LED's 16. A connector 30 for interfacing with an LED driver 40 to provide the necessary voltage and current is connected to the printed circuit board 14. The thermal conductive material 18 provides the necessary thermal interface between the LED's 16 on the printed circuit board 14 and the edge rail housing 20. The thermal conductive material can also exhibit mechanical compliance properties to provide a secure fit for the LED backlight unit 10 to the edge rail housing 20. The number of LED backlight units 10 required for a particular application will depend on which of the various configurations are used to implement backlighting for a particular LCD display. For example, if the LED backlight unit 10 is used to retrofit an existing CCFL backlight display, the number of LED backlight units 10 required will be based on the number of lamps (e.g., single, dual, and triple) and the number of edges (e.g., single or dual) with those lamps.

By designing the LED backlight unit 10 to fit within the existing edge rail housing 20 of the backlight source, replacements or retrofits of LCD displays having CCFL backlights or similar backlight configurations can be accomplished with minimal effort and expense. Since the edge rail housing 20 can typically be accessed without removing any, or only a few, pieces of hardware and optics, and the LED backlight unit 10 can be placed within the existing edge rail housing 20 or using a new edge rail housing 20 of comparable dimensions, a CCFL backlight unit or other backlight unit can be replaced without having to necessarily replace or modify any of the hardware and optics typically used for the LCD display, including, for example, the front frame, lens sheet, diffuser sheet, light pipe, reflector sheet, reflector, and back frame.

Figure 2:
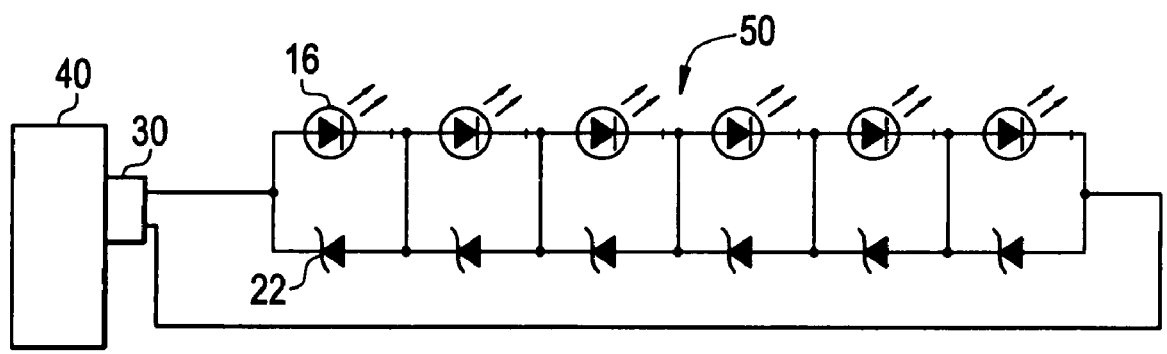
FIG. 2 is a circuit diagram for a series connection of LED's in an LED backlight unit.

FIG. 2 shows a circuit diagram for a single series connection 50 of LED's 16 in an LED backlight unit 10. The series connection 50 of LED's 16 is connected to a connector 30 for interfacing with a LED driver 40. The LED's 16 vary in size and manufacture and should be chosen so as to provide the best optical efficacy and focal properties. Examples of LED's 16 that may be used for use in a LED backlight unit 10 include but are not limited to standard LED's or HBLED's. The LED's 16 can be white or colored (RGB) depending upon the requirements of the application. While a single drive channel can be used for a single series connection of white LED's 16, the use of RGB LED's would require separate drive channels and series connections of LED's for each color. While white LED 16 applications may require diffusion for backlighting LCD panels, RGB LED 16 applications would additionally require color mixing.

The number and spacing of LED's 16 should be chosen to provide the best uniformity of light when coupled to the edge rail housing 20 while maintaining an acceptable thermal management performance. The greater the number of LED's 16 provided, the greater the uniformity of light and the greater need for thermal management. Obviously, the larger the LCD display, the greater the number of LED's 16 needed to provide adequate backlighting. As illustrated in FIG. 1, the configuration of the LED's 16 in a single series connection 50 minimizes the space needed to fit the LED backlight unit 10 into the edge rail housing 20. This series configuration also eliminates the need for current limiting resistors, which improves the power efficiency of the LED backlight unit 10. To address concerns that the failure (e.g., open or short circuit) of a single LED 16 in the series connection 50 would result in all of the LED's 16 losing illumination, individual zener diodes 22 are placed in parallel with each LED 16 to provide an alternative current path to maintain the series connection in the event of failure.

Each series connection 50 of LED's 16 can have a driver unit 40 for maintaining the constant current through the series connection 50 and providing the necessary forward voltage. Accordingly, the driver unit 40 can be capable of developing at least the required forward voltage for the series connection 50 of LED's 16, accounting for any ancillary voltage drop elsewhere in the circuit. Since the typical available input voltage is in the range of +5V to +24V with +12V being the most common, and many LED backlight applications will require a driver unit 40 that can develop the required forward voltage (often 42 volts or greater), the input voltage must be stepped-up by a step-up circuit to achieve the required forward voltage to drive the series connection 50 of LED's 16. Depending upon the required forward voltage, this step-up circuit can comprise a boost converter topology, including the use of multiple boost converters, or a transformer.

Figure 3:
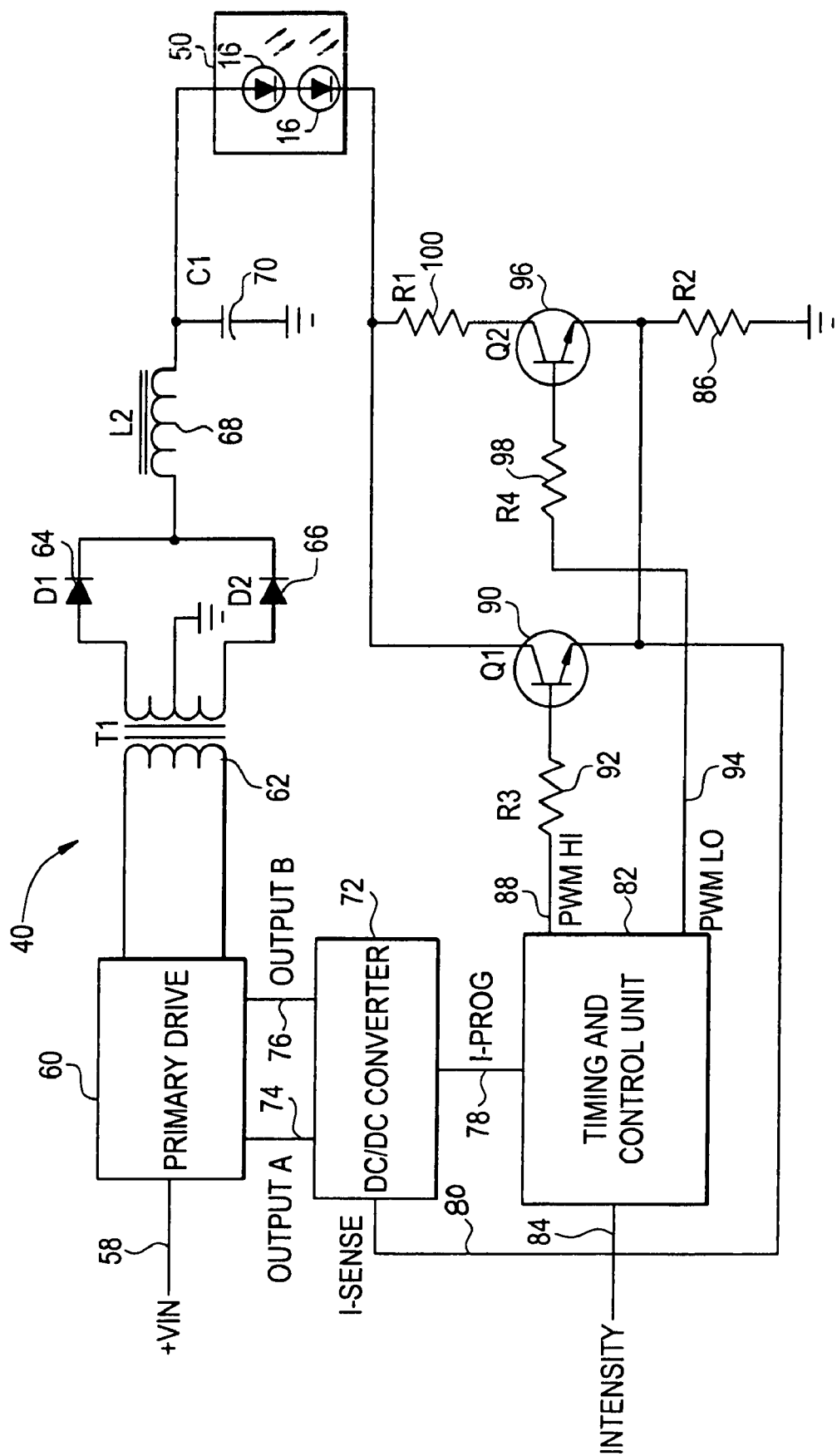
FIG. 3 is a circuit diagram for a driver unit for a series connection of LED's in an LED backlight unit, including dimmer control.

FIG. 3 shows a circuit diagram for a driver unit 40 for a series connection 50 of LED's 16 in an LED backlight unit 10. Although the example disclosed is directed to a single series connection 50 of LED's 16, the driver unit 40 can also be used for multiple series connections 50 of LED's 16 connected in series or in parallel. The driver unit 40 can be located within the display or elsewhere and interfaces with the LED backlight unit 10 through the connector 30. Input voltage (+VIN) 58 can be applied to the primary drive 60, which may be a half-bridge driver, full-bridge driver, or push-pull driver configuration to drive transformer T1 62 in a full-wave manner. The secondary voltage of transformer T1 62 is rectified and filtered by diodes D1 64 and D2 66 and inductor L2 68 and capacitor 70 to provide the required forward voltage. The turns ratio of the transformer T1 62 is selected to provide at least the step-up for the required forward voltage and constant current for the series connection 50 of LED's 16. In order to provide flexibility to accommodate different required forward voltages and a wide range of step-up ratios, the specific required turns ratio can be manually configured by providing solder-switches to select the primary tap needed for that required ratio. Similarly, the driver unit 40 can be designed with interchangeable secondary winding daughter-boards to support a wide range of step-up ratios.

In addition to providing the forward voltage and constant current required to drive the series connection 50 of LED's 16 of the LED backlight unit 10, the driver unit 40 can also provide intensity or dimming control. In the driver unit 40, the apparent intensity or brightness of the LED's 16 can be controlled by modifying the constant current level (amplitude) driving the LED's 16. The apparent intensity of the LED's 16 can also be controlled by using pulse width modulation (PWM) techniques (e.g., turning the LED's 16 on and off while varying the duty cycle (ratio of on-time to off-time) of the drive current). To avoid any apparent flickering, the LED's 16 can be turned on and off to modify the intensity of the LED's 16 at a high enough frequency (e.g., 60 Hz or higher) where it will not be noticed by the human eye. At this or higher frequencies, varying the duty cycle to further modify the intensity of the LED's will also not experience any apparent flickering. For example, providing a shorter duty cycle (time-on) will result in less intensity than when providing a longer duty cycle. Finally, the intensity of an LED 16 can be controlled by using a combination of amplitude adjustment of the constant current level as well as PWM in a "mixed-mode." Each of these modes of dimming operations (amplitude, PWM, and mixed mode) can be used independently or in unison depending upon the demands of the application.

The primary drive 60 can be directly controlled by a DC/DC converter 72, through OUTPUT A 74 and OUTPUT B 76. These signals, which are 180° out of phase from each other, use PWM to control the primary drive's 60 output to transformer T1 62. For example, providing a shorter duty cycle (time-on) for OUTPUT A 74 and OUTPUT B 76 will result in lower constant current than a longer duty cycle. The DC/DC converter 72 can be a high frequency switching DC/DC power converter or similar device. The switching times for the DC/DC converter 72 are typically in the range of 100 kHz to 1 MHz. The value of these output signals from the DC/DC converter 72 can be determined based on the input I-PROG 78 and input I-SENSE 80 to the DC/DC converter 72.

The signal I-PROG 78 is generated by the timing and control unit 82, which receives input INTENSITY 84, specifying the desired intensity or brightness for the LED's 16. The timing and control unit 82 can be a processor, microcontroller, microprocessor, microcomputer, programmable logic array, or similar device. The input INTENSITY 84 can be provided as an analog or digital signal generated by a user or other source. For example, the value for input INTENSITY 84 can be controlled or selected by a knob or button controlled by a user. The value of input I-PROG 78, which is determined based on the value of input INTENSITY 84, is selected by the timing and control unit 82 to specify to the DC/DC converter 72 the required OUTPUT A 74 and OUTPUT B 76 signals sent to the primary drive 60 to result in the required amplitude of the constant current output to the series connection 50 of LED's 16 to provide the desired intensity or dimming. In order to monitor that the LED's 16 are receiving the required constant current amplitude, the DC/DC converter 72 monitors the current flowing through the LED's 16 through feedback signal I-SENSE 80 to determine if it is equal to the desired current specified by input I-PROG 78. If the values of I-PROG 78 and I-SENSE 80 are equal, no modification to OUTPUT A 74 and OUTPUT B 76 signals need be made. However, if the two values are not equal, the OUTPUT A 74 and OUTPUT B 76 signals are modified to produce the required increase or decrease in current value. The value of I-SENSE 80 can be determined by monitoring the current flowing through (or voltage across) sense resistor R2 86 or through the use of a current probe or similar device. While this method of modifying the amplitude of the constant current flowing through LED's 16 can be effective over a wide range of intensities, operating LED's 16 below a certain current value (low threshold current) can result in luminous instability, which in turn results in flickering observed by the human eye. Accordingly, for specified low intensities that would require a constant current amplitude below the low threshold current, PWM can be used to provide the desired dimming without having to reduce the constant current amplitude below the low threshold current.

In addition to specifying the I-PROG 78 signal based on the desired INTENSITY 84 input, the timing and control unit 82 can also specify when to use PWM to provide the desired intensity. As shown in FIG. 3, the timing and control unit 82 has an output PWM HI 88 which controls the operation of transistor Q1 90 through resistor R3 92. The transistor can be a MOSFET, IGBT, or similar device. For intensities requiring a constant current above the low threshold current and therefore not requiring PWM, output PWM HI 88 remains high, turning on and leaving transistor Q1 90 in an active state. However, when the timing and control unit 82 determines PWM will be required to provide the desired intensity, typically at low intensity levels, the timing and control unit 82 controls output PWM HI 88 to provide the necessary duty cycle switching at a high enough frequency (e.g. 100 Hz) to turn the transistor Q1 90, and therefore the current flowing the LED's 16, on and off at a rate and for durations required to produce the desired intensity or dimming.

While the PWM technique using PWM HI 88 can be used to provide increasingly lower levels of intensity by providing shorter duty cycles, for extremely low levels of required intensity where the duty cycle would be so short in duration that it could lead to instability in the luminosity of the LED's 16, a secondary PWM technique can be used in lieu of PWM HI 88. As shown in FIG. 3, the timing and control unit 82 has an output PWM LO 94 which controls the operation of transistor Q2 96 through resistor R4 98. In those cases where the specified INTENSITY 84 is below the point where the primary PWM technique (PWM HI 88) may result in flickering, the timing and control unit 82 turns PWM HI 88 and Q1 90 off and controls output PWM LO 94 to provide the necessary duty cycle to turn the transistor Q2 96 and therefore the current flowing the LED's 16 on and off at a rate and for durations required to produce the desired intensity or dimming. By placing current limiting resistor R1 100 in series with transistor Q2 96, the circuit effectively reduces the constant current amplitude, thereby allowing for longer duty cycles in providing the required PWM by PWM LO 94 and transistor Q2 96.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements or steps that do not differ from the literal language of the claims, or if they include equivalent structural elements or steps with insubstantial differences from the literal language of the claims.

What is claimed is:

1. A method for driving LED's comprising the steps of:
   receiving a desired intensity value, wherein said desired intensity value represents the desired intensity for said LED's;

generating a first switching control signal, wherein said first switching control signal is a pulse width modulated signal whose duty cycle is based on said desired intensity value;

switching said LED's on and off based on said first switching control signal, wherein said switching takes place when said desired intensity value is less than a first desired intensity value threshold;

generating a desired constant current value based on said desired intensity value, wherein said desired constant current value represents the value of the desired constant current to drive said LED's;

determining an actual constant current value, wherein said actual constant current value represents the value of the actual constant current driving said LED's;

comparing said actual constant current value with said desired constant current value; and adjusting the output of the primary drive of said LED's so that said actual constant current value is equal to said desired constant current value.

2. The method of claim 1, further comprising the steps of:
generating a second switching control signal, wherein said second switching control signal is a pulse width modulated signal whose duty cycle is based on said desired intensity value;

switching said LED's on and off based on said second switching control signal, wherein said switching takes place when said desired intensity value is less than a second desired intensity value threshold, and wherein said second desired intensity value threshold is less than said first desired intensity value threshold.

3. The method of claim 1, wherein said step of adjusting said output of said primary drive is made by using pulse width modulation to adjust the duty cycle of said primary drive.

4. The method of claim 1, wherein said LED's are connected in a series connection of LED's.

5. The method of claim 1, wherein said LED's are connected in a parallel bank of series connections of LED's.

6. The method of claim 1, wherein said LED's are HBLED's.

7. An apparatus for driving LED's comprising:
means for receiving a desired intensity value, wherein said desired intensity value represents the desired intensity for said LED's means for generating a first switching control signal, wherein said first switching control signal is a pulse width modulated signal whose duty cycle is based on said desired intensity value;

means for switching said LED's on and off based on said first switching control signal, wherein said switching takes place when said desired intensity value is less than a first desired intensity value threshold;

means for generating a desired constant current value based on said desired intensity value, wherein said desired constant current value represents the value of the desired constant current to drive said LED's;

means for determining an actual constant current value, wherein said actual constant current value represents the value of the actual constant current driving said LED's;

means for comparing said actual constant current value with said desired constant current value; and means for adjusting the output of the primary drive of said LED's so that said actual constant current value is equal to said desired constant current value.

8. The apparatus of claim 7, further comprising:
means for generating a second switching control signal, wherein said second switching control signal is a pulse width modulated signal whose duty cycle is based on said desired intensity value; and means for switching said LED's on and off based on said second switching control signal, wherein said switching takes place when said desired intensity value is less than a second desired intensity value threshold, and wherein said second desired intensity value threshold is less than said first desired intensity value threshold.

9. The apparatus of claim 7, wherein said LED's are connected in a series connection of LED's.

10. The apparatus of claim 7, wherein said LED's are connected in a parallel bank of series connections of LED's.

11. An apparatus for driving LED's comprising:
a timing and control unit;

a first input of said timing and control unit for receiving a desired intensity value, wherein said desired intensity value represents the desired intensity for said LED's;

a first output of said timing and control unit for generating a first switching control signal, wherein said first switching control signal is a pulse width modulated signal whose duty cycle is based on said desired intensity value;

a first transistor;

the collector of said first transistor coupled to the output of said LED's;

the base of said first transistor coupled to said first output of said timing and control unit for switching said LED's on and off based on said first switching control signal, wherein said switching takes place when said desired intensity value is less than a first desired intensity value threshold;

a second output of said timing and control unit for generating a desired constant current value based on said desired intensity value, wherein said desired constant current value represents the value of the desired constant current to drive said LED's;

a DC/DC converter;

a first input of said DC/DC converter coupled to the emitter of said first transistor for determining an actual constant current value, wherein said actual constant current value represents the value of the actual constant current driving said LED's;

a second input of said DC/DC converter coupled to said second output of said timing and control unit for receiving said desired constant current value;

a primary drive coupled to said DC/DC converter, wherein said DC/DC converter controls the output of said primary drive so that said actual constant current value is equal to said desired constant current value; and a step-up circuit coupled to said primary drive for supplying constant current to the input of said LED's at a stepped-up voltage.

12. The apparatus of claim 11, further comprising:
a third output of said timing and control unit for generating a second switching control signal, wherein said second switching control signal is a pulse width modulated signal whose duty cycle is based on said desired intensity value;

a second transistor;

the collector of said second transistor coupled to a current limiting resistor, said current limiting resistor coupled to said output of said LED's;

the emitter of said second transistor coupled to the emitter of said first transistor;

the base of said first transistor coupled to said second output of said timing and control unit for switching said LED's on and off based on said second switching control signal, wherein said switching takes place when said desired intensity value is less than a second desired intensity value threshold, and wherein said second desired intensity value threshold is less than said first desired intensity value threshold.

13. The apparatus of claim 11, wherein said LED's are connected in a series connection of LED's.

14. The apparatus of claim 11, wherein said LED's are connected in a parallel bank of series connections of LED's.

15. The apparatus of claim 11, wherein said timing and control unit is a microcontroller.

16. The apparatus of claim 11, wherein said primary drive is a push pull driver configuration.

17. The apparatus of claim 11, wherein said step-up circuit is a transformer.

18. The apparatus of claim 11, wherein said step-up circuit is a boost converter topology.

* * * * *